United States Patent [19]
Hoffmann

[11] Patent Number: 4,753,778
[45] Date of Patent: Jun. 28, 1988

[54] APPARATUS FOR CONDUCTING A GAS MIXTURE IN A CLOSED CIRCUIT

[75] Inventor: Peter Hoffmann, Stuttgart, Fed. Rep. of Germany

[73] Assignee: Carl Baasel Lasertechnik GmbH, Starnberg, Fed. Rep. of Germany

[21] Appl. No.: 717,179
[22] PCT Filed: Jul. 27, 1983
[86] PCT No.: PCT/EP83/00199
§ 371 Date: Mar. 27, 1985
§ 102(e) Date: Mar. 27, 1985
[87] PCT Pub. No.: WO85/00536
PCT Pub. Date: Feb. 14, 1985
[51] Int. Cl.⁴ ............................................. B01J 19/08
[52] U.S. Cl. ...................... 422/186.04; 204/DIG. 11; 250/423 P; 250/437; 422/186
[58] Field of Search .............. 422/186.04, 186, 186.07, 422/186.29, 906, 907, 186.18, 186.19, 186.2, 186.11; 204/157.2, 157.21, 157.22, 157.4, 157.41, 157.6, 157.61, DIG. 11; 250/437, 423 P

[56] References Cited
U.S. PATENT DOCUMENTS
3,801,791  4/1974  Schaefer ...................... 472/186 X
4,043,886  8/1977  Bieker et al. .................. 422/186 X
4,097,384  6/1978  Coleman et al. ............ 204/DIG. 11
4,119,509 10/1978  Szoke ......................... 204/DIG. 11
4,563,258  1/1986  Bridges ......................... 422/186 X

FOREIGN PATENT DOCUMENTS
1045725  1/1979  Canada .
2900689  7/1980  Fed. Rep. of Germany .
2412770  1/1981  Fed. Rep. of Germany ................... 422/186.07
2053717A 6/1980  United Kingdom .

Primary Examiner—John F. Terapane
Assistant Examiner—Susan Wolffe
Attorney, Agent, or Firm—Bacon & Thomas

[57] ABSTRACT

The invention relates to an apparatus for conducting a molecular gas or gas mixture containing at least one molecular component, in a closed circuit, in particular for the purpose of generating processes in the gas or gas mixture involving its partial ionization and the stimulation of molecules to vibrate in the corresponding gas component. The apparatus comprises two similarly designed flow channels preferably having a rectangular cross-section. The broadsides of the channels are arranged beside each other or constructionally integrated and are connected with each other at their adjacent ends by two apparatus for circulating gas, in such a way that the gas can flow through them in opposite directions. Electrodes are set in partial areas of each channel, electrically insulated from the channel walls, the electrode closer to the other channel in each case being electrically connected, or constructionally identical, to the corresponding electrode of this other channel.

6 Claims, 3 Drawing Sheets

SECTION A-A

SECTION B-B

SECTION C-C

APPARATUS FOR CONDUCTING A GAS MIXTURE IN A CLOSED CIRCUIT

The present invention relates to an apparatus for conducting a molecular gas or gas mixture containing at least one molecular component, in a closed circuit, in particular for generating processes in the corresponding gas or gas mixture involving its partial ionization and the stimulation of molecules to vibrate in the corresponding gas component.

Processes which take place in molecular gases or gas mixtures containing at least one molecular component which are characterized by partial ionization and the stimulation of molecules to vibrate substantially serve the following three purposes: the initiation and execution of plasma-chemical reactions, isotope separation and the production of a laser-active state.

It is sufficiently well-known for all three areas of application to carry out such processes in open systems, i.e. systems in which the gas flows through the reaction zone only once (see e.g. German Offenlegungsschrift No. 26 51 306; Proc. IEEE, 2(1974)1, p. 4 ff; Angew. Chemie, 84. Jahrg. (1972) 18, pp. 876 ff; IEEE Transactions on Plasma Science, PS-2(1974), p. 297–307; J. Microwave Power, 10(1975)4, p. 433–440; Sov. Phys. Dokl. 23(1978)1, p. 44–46; J. Microwave Power, 12(1977)2, p. 155–166). In the laser field, systems having a closed gas circuit even dominate; these systems are gas-dynamic or gas transport lasers (see e.g. Appl. Phys. 22 (1980), pp. 421–427; Appl. Phys. Letters 15 (1969)3, p. 91–93; ALAA-Paper 72-723 (1972); U.S. Pat. No. 4,096,449).

In the cases of plasma chemistry and isotope separation small reaction yields are generally obtained using an open system since only part of the starting substance ever participates in the desired reaction process.

In the case of the laser, however, the disadvantage of the stated apparatus is that one must make use of either passive feedbacks with a large cross-section to reduce the frictional losses in the flow, or elaborate pump systems for circulating the gas to overcome these frictional losses. The former leads to a heavy construction with a large volume, the latter to unfavorable overall efficiency.

The invention is based on the problem of increasing the yield with respect to the quantity of the starting substance, in the case of use in plasma chemistry and isotope separation; of combining a compact construction with high overall efficiency in the case of use as a laser.

The problem is solved according to the invention by the following features: two similarly designed flow channels having a preferably rectangular cross-section are arranged with their broadsides directly beside each other or are integrated constructionally, and are connected with each other at their adjacent ends by two apparatus for circulating gas, in such a way that the gas flows through them in opposite directions and electrodes are set in partial areas of each channel electrically insulated from the channel walls, the electrode closer to the other channel in each case being electrically connected, or constructionally identical, to the corresponding electrode of this other channel.

It is further expedient when the apparatus is used for the purposes of isotope separation and when it is used as a gas-dynamic or gas-transport laser, for openings which allow for electromagnetic radiation, preferably laser radiation, to pass through substantially at right angles to the direction of flow, to be provided in the narrow sides of the two channels.

It is further advantageous for the supply or removal of gas when the apparatus is used for the purposes of plasma chemistry and isotope separation, for a plurality of openings having a small diameter to be provided in the broadsides of the channels, or in the electrodes which form part of these broadsides.

It is also advantageous in the case of use as a gas-dynamic or gas-transport laser for the two channels to be connected with each other by a plurality of openings having a small diameter in the two broadsides facing each other.

It is advantageous in a number of applications, in the interests of controlling the residence time of the gas in the area of its reciprocal action with a discharge produced between the stated electrodes, or with a radiation field coupled in through the stated openings in the narrow sides of the channels, to increase the rate of flow of the gas in this reciprocal action zone by giving the cross-section of the two flow channels a nozzle-like constriction.

The advantages achieved by the invention consist, in the case of use in the fields of plasma chemistry and isotope separation, in the gas flowing through the stated reciprocal action zone repeatedly, thereby being used for the desired processes more efficiently than if it only flows through once. The openings in the broadsides allow for the supply of fresh gas or the removal of the products obtained or of enriched isotope mixture at the points of the process which are most favorable in each case. If the cross-section of the channel is changed by a nozzle-shaped construction, the residence time of the gas in the reciprocal action zone of the particular reaction can be optimally adapted as a result of the changed rate of flow. Finally, if a nozzle shape which allows for a supersonic flow to occur is selected, the temperature of the gas in the reciprocal action zone can additionally be adapted to the optimal parameters for the desired reaction as a result of the cooling by expansion.

When the apparatus is used as a gas-dynamic or gas-transport laser, it is advantageous that a compact construction and low expenditure of energy for the circulating system are obtained by avoiding a passive feedback of the gas. It is further advantageous for the reciprocal action zones of each channel to be arranged within an optical resonator folded in a U shape due to the openings in the narrow sides. When the beam is switched twice by 90° in each case in a resonator folded in a U shape, the preferred polarization direction of the laser radiation is clearly defined due to the different degrees of reflection of the mirror surfaces in the case of oblique incidence of light, parallel or at right angles to the plane or incidence, so that the polarization direction can then be converted into circularly polarized radiation after passing through a doubly refracting medium. It is known that such a circularly polarized radiation is particularly well-suited for a number of tasks in material processing. Further, the asymmetry of the beam profile in the direction of flow which generally occurs in the case of gas-dynamic and gas-transport lasers is eliminated since the reciprocal action zones are flowed through in opposite directions. This contributes to improving the laser mode in the near field, and to improving the focusability of the laser beam. The connection of the two flow channels by means of capillary openings in the broadsides facing each other has the following effect: due to the pressure drop when one channel is being flowed through, the pressure before the reciprocal action zone is higher than behind it. Thus, a connection of the stated type between the area of higher pressure in one of the channels and the area of lower pressure in the other channel causes the boundary layer which gradually builds up in the inlet to the reciprocal action zone to be evacuated towards the other channel. This evacuation of the boundary layer is useful for the stability of the discharge, for it is known that discharge instability chiefly forms in the area of the boundary layer of flow. If necessary, the boundary layer of flow may also be evacuated by appropriate constructional measures at the braodsides of the channels facing away from each other. The advantages of a nozzle-like constriction also hold in the case of use as a gas-dynamic or gas-transport laser.

Figure 1:
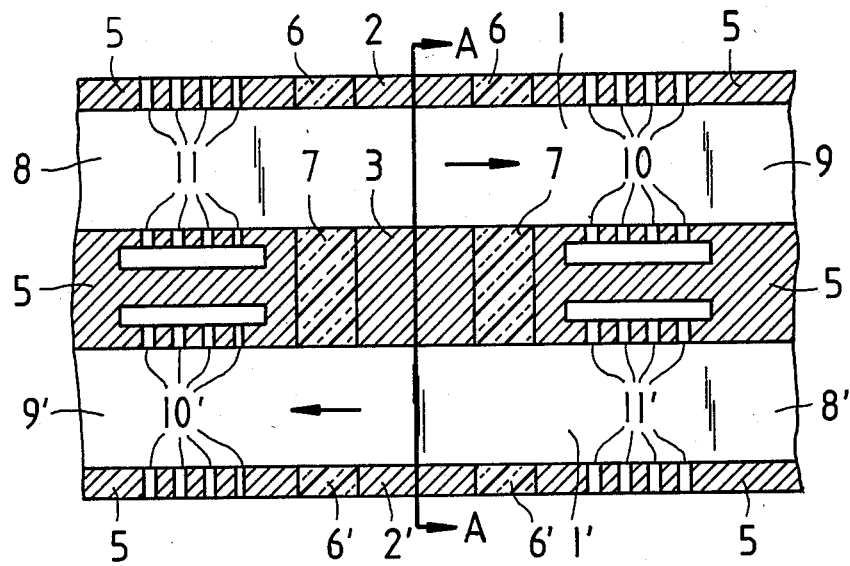
FIG. 1 shows a longitudinal sectional view schematically illustrating one embodiment of the invention.
Figure 2:
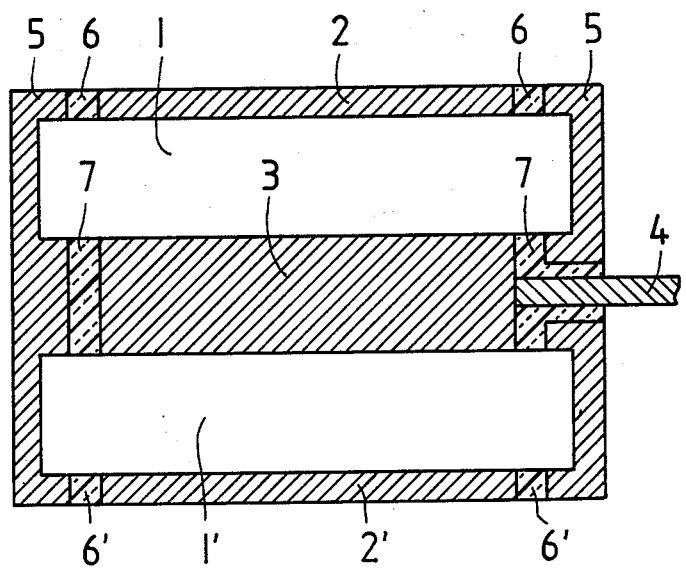
FIG. 2 is a sectional view taken along line A—A in FIG. 1.

An embodiment of the invention for use in the field of plasma chemistry is shown in FIG. 1 as a longitudinal section and in FIG. 2 as a cross-section A—A. The main portion of the gas flows in the direction of the arrow through the two channels 1 and 1'. The arrangement of outside electrodes 2 and 2' is only shown schematically, as is that of the common center electrode 3, which has a connection to the outside formed by connection 4. These electrodes are electrically separated from channels walls 5 by insulating elements 6, 6' and 7, preferably made of ceramics. These elements are connected to each other in a vacuum-tight manner which is known per se. The channel ends at which the gas enters, 8 and 8', and those through which the gas exits, 9 and 9', are connected to each other by gas circulating systems such as Roots compressors, axial compressors, radial compressors, side channel compressors or cross current ventilators, which are known per se, in such a way that a gas circulating system connects outlet opening 9 with inlet opening 8' and a second gas circulating system connects outlet opening 9' with inlet opening 8. It is necessary in most cases that heat exchangers, which are also known, be located in outlet openings 9 and 9' to cool the gas. Between electrodes 2 and 3, and 2' and 3, there is an electrical d.c. or a.c. field for generating a glow discharge in order to initiate the desired reaction. In this discharge the starting substances are partially ionized and the molecules stimulated to vibrate, so that they can preferably undergo the desired chemical reactions. The products obtained can now be either evacuated through openings 10 and 10' or frozen out at the above-mentioned heat exchangers. The replacement of used up starting substances may take place by supplying gas through openings 11 and 11'. The ratio of the quantity of circulated gas to the quantity of newly supplied or removed gas may be easily adapted to the particular situation by the number and diameter of the openings, and by appropriate selection of the pressure difference with respect to the outer collecting pipes (not shown).

Figure 3:
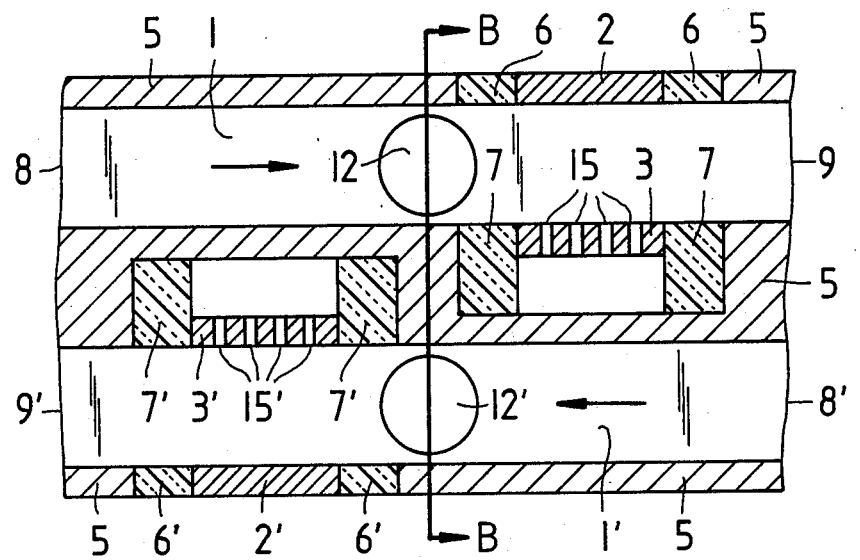
FIG. 3 shows a longitudinal sectional view schematically illustrating another embodiment of the invention.
Figure 4:
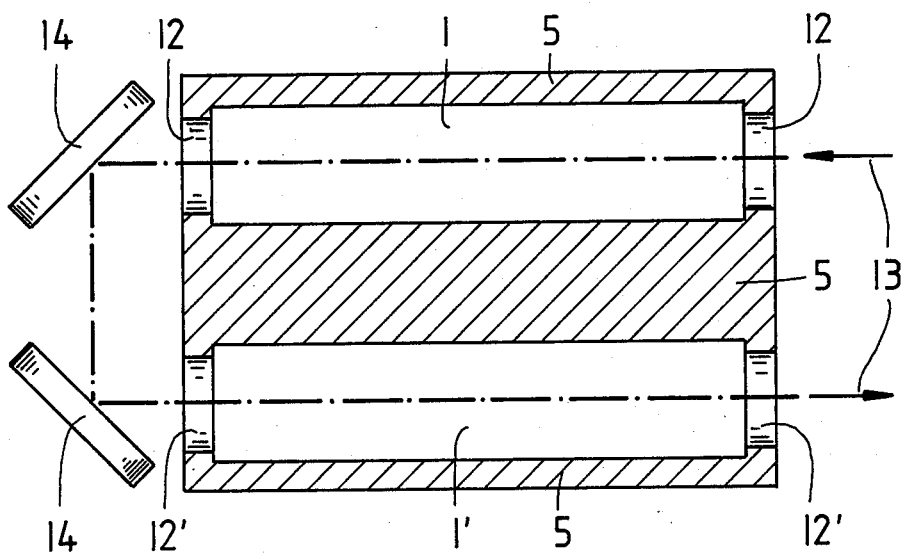
FIG. 4 is a sectional view taken along line B—B in FIG. 3.

FIGS. 3 and 4 show a modified embodiment in the same manner as FIGS. 1 and 2. It is a variant for isotope separation. In addition to those components and functions which coincide with those of FIGS. 1 and 2, openings 12 and 12' are provided in the narrow sides of the channels. They are sealed off by pressure windows known per se and not shown. Electrodes 2, 2' and 3, 3' are staggered with respect to these openings in the downstream direction. The gas, which for example consists of isotope mixtures $^{238}UF_6$ and $^{235}UF_6$, comes into reciprocal action with a laser beam 13 in the area of openings 12, 12', the beam being deflected by mirror 14. An isotope component is selectively stimulated to vibrate, e.g. by laser radiation in the wavelength range of 16 micrometers. The gas then enters the discharge zone, electrodes 2, 2' acting as anodes, 3, 3' as cathodes. The component stimulated to vibrate is preferably ionized and enriched with the electrical field in the area of the cathode as a result of the reciprocal action of the positively charged ions. The arrangement of the electrodes may of course be interchanged correspondingly. Openings 15 through which the enriched mixture is evacuated are provided in the cathodes.

Figure 5:
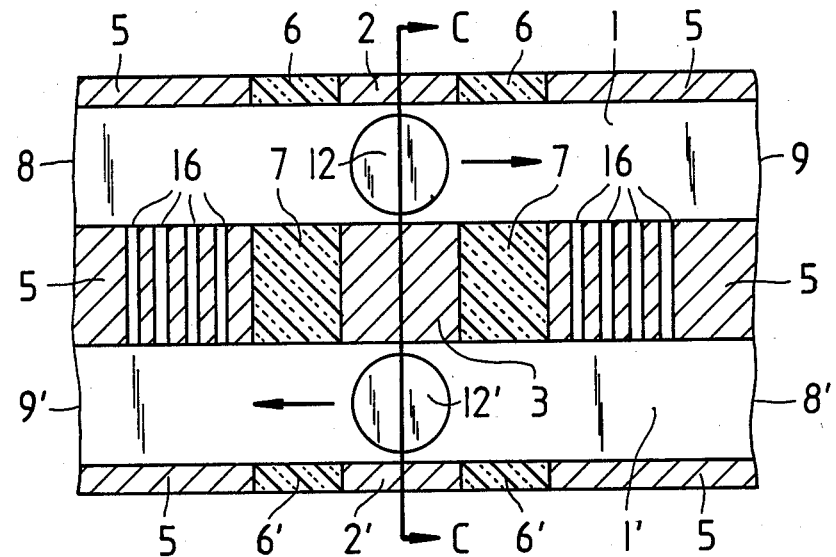
FIG. 5 shows a longitudinal sectional view schematically illustrating another embodiment of the invention.
Figure 6:
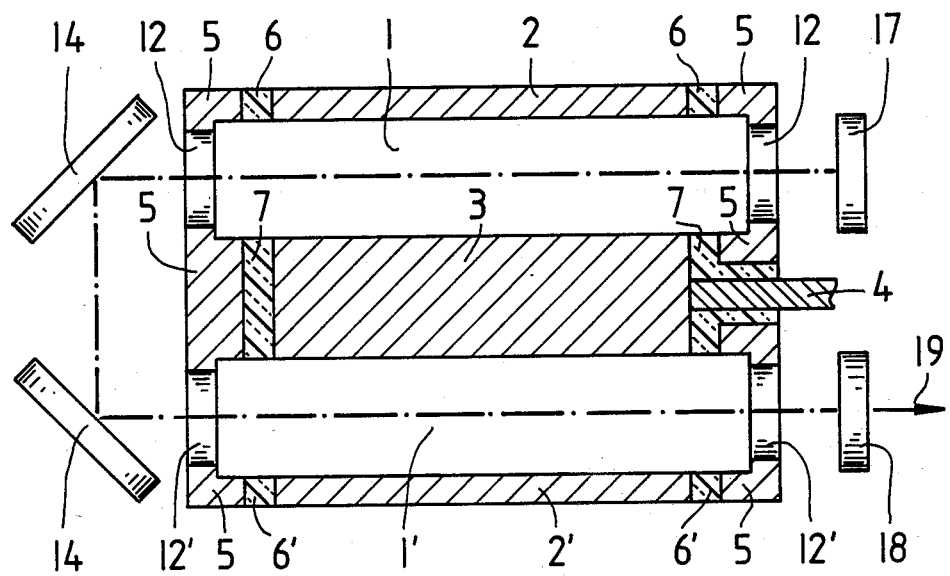
FIG. 6 is a sectional view taken along line C—C in FIG. 5.

FIGS. 5 and 6 show a further modified embodiment in the same manner as FIGS. 1 and 2. This variant is for use as a gas transport laser. As in FIGS. 3 and 4, openings 12 and 12' are set in the narrow sides of the channels. They are either sealed off by pressure windows transparent for laser radiation and known per se, or connected in a pressure-sealed manner to deviation mirrors 14 or totally reflecting laser mirror 17 and partly pervious laser mirror 18, by which laser beam 19 is coupled out. The resonator may also be folded several times or be a resonator of the astable type. The discharge which is produced by a d.c. or a.c. field applied to electrodes 2, 2' and 3 is substantially superimposed on the reciprocal action zone with the radiation field which forms in the resonator. This view does not rule out the advantageous segmentation of the electrodes, which is known per se, or their being covered by a dielectric layer. Both measures serve to stablilize the discharge. Openings 16 serve to evacuate the boundary layer in the inlet area to the discharge, a measure which also contributes to stabilizing the discharge. The view does not rule out the design of the channels in a convergent-divergent nozzle shape, either. This not only increases the rate of flow in the discharge zone, resulting in a higher power density of the radiation field which may be obtained, but also reduces the frictional losses of the flow in the channels. The remaining components and functions are identical to those of FIGS. 1 and 2.

I claim:

1. Apparatus for conducting a molecular gas or gas mixture containing at least one molecular component, in a closed circuit, comprising two geometrically similar flow channels each having a rectangular cross-section with broad and narrow sides arranged with their broadsides adjacent each other or integrated constructionally, and connected with each other at their adjacent ends by means for circulating gas, in such a way that the gas flows through them in opposite directions; and a pair of opposed electrodes set in the sides of each channel and insulated from the channel sides; one electrode of each pair being disposed in one of said adjacent broadsides of each channel; each of said one electrodes having identical polarity opposite the polarity of the other electrode of each pair of opposed electrodes.

2. The apparatus according to claim 1, including openings in the narrow sides of each channel for admitting electromagnetic radiation, for example laser radiation, in a direction such that the radiation passes through each channel substantially at right angles to the direction of gas flow in the channel.

3. The apparatus according to claim 1, including a plurality of openings with a small diameter disposed in the broadsides of the channels, or in the electrodes which form part of these broadsides.

4. The apparatus according to claim 2, wherein the two channels are connected with each other by a plurality of openings having a small diameter in the two broadsides facing each other.

5. The apparatus according to claim 1 wherein the cross-section of the two flow channels exhibits a nozzle-like constriction.

6. The apparatus according to claim 1, wherein said one electrodes of each pair disposed in the broadsides of the channels are electrically connected together.

* * * * *